J. L. ALBERGER.
Refrigerating Apparatus.
No. 8,109. Reissued Feb. 26, 1878.
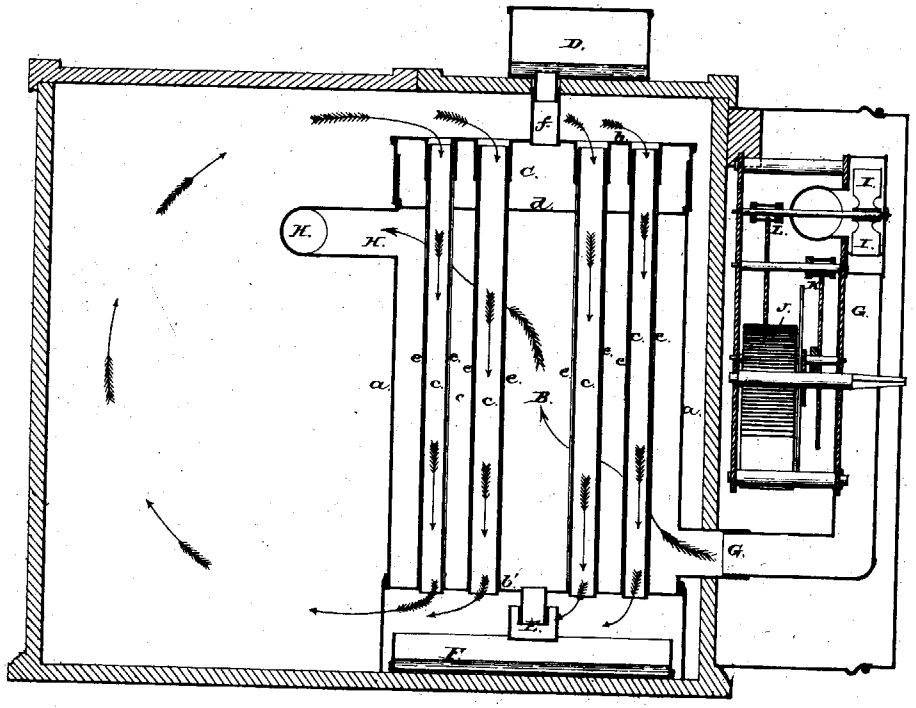
Attest:
H. C. Bates
W. E. Frame
Inventor:
John L. Alberger
By Amos Broadnax
Atty

UNITED STATES PATENT OFFICE.

JOHN L. ALBERGER, OF BUFFALO, NEW YORK.

IMPROVEMENT IN REFRIGERATING APPARATUS.

Specification forming part of Letters Patent No. 39,456, dated August 11, 1863; Reissue No. 8,109, dated February 26, 1878; application filed March 22, 1877.

*To all whom it may concern:*

Be it known that I, J. L. ALBERGER, of Buffalo, in the county of Erie and State of New York, have invented certain new and useful Improvements in Artificially Cooling Cars, Rooms, Buildings, Apartments, Chests, &c.; and that the following is a full, clear, and exact description thereof, reference being had to the accompanying drawing, making a part of this specification, in which the figure represents a vertical section through an apartment and through the cooling apparatus and a reservoir to contain and supply the refrigerant, so as to show the general characteristics of this invention, it being obvious that various modifications of this general plan may be made to apply to special purposes or peculiar localities.

My invention consists in the use of an apparatus having a cooling or evaporating chamber and a reservoir to contain and supply the refrigerant, in connection with an inclosed apartment, and with pipes or tubes through which the air in the apartment to be cooled and dried passes by a natural current, said tubes or pipes being, for the better retention of the evaporating fluid in contact with them, covered with cloth or other material that will become saturated with the fluid and retain it thus in contact, and be subjected to a forced current of air driven through or between them.

To enable others skilled in the art to make and use my invention, I will proceed to describe the same in connection with the drawings.

A may represent the apartment to be cooled, and B the cooling apparatus. The cooling apparatus is constructed as follows: An outer case, *a*, having two heads, *b b'*, connected so as to make it tight against the external air, is used. Through the interior of the case are passed a series of air-passages, *c*, which may be vertical or horizontal, and composed of tubes, pipes, or partition-sheets, as may be preferred, so as to make an extended surface, said air-passages at their top and bottom, or at both ends, being open to the atmosphere of the room or apartment to be cooled. An interior head or partition, *d*, is also provided, so as to furnish a chamber, C, above the cooling-chamber B, to retain and distribute the refrigerant through the cooler, and over the chamber C there is a reservoir, D, for containing the water or other cooling or evaporating fluid or refrigerant used. At the lower end of the cooling-chamber there is an air-trap, E, that will allow the condensed fluid of the cooling-chamber to escape without admitting air therein. The fluid of condensation from the cooling-chamber B, as well as that from the air-passages, is caught in a pan or other receiver, F, placed under the apparatus, or carried away by a pipe.

G is an air pipe or passage leading from the outside of the apartment that is to be cooled, and into the cooling-chamber B.

H is an exit-pipe, leading from the cooling-chamber to a chimney or to the external air, to carry off the vapors or gases that may arise from the evaporating fluid in the cooling-chamber.

The air may be driven into or through the cooling-chamber by a fan, I, worked by machinery, or, as in a car, by a cowl, or by a fan or bellows worked from the running-gear of the car.

I have shown the fan as driven by a main-spring, J, through cog and pinion gears K and L; but the current of air may be produced in any other well-known manner, and may, of course, be regulated or stopped as may be required.

The tubes for forming the air-passages *c* I have represented as covered on their surfaces next the cooling-chamber with cloth *e*, for the purpose of insuring their contact with the evaporating fluid without using said fluid in excessive quantities.

I do not restrict my invention to the use of this or any other covering material, for it may be dispensed with entirely, though its use would be beneficial. The extended evaporating-surface may be obtained otherwise than by tubes or partitions, as, for instance, by pebbles, or by any mineral or metallic substances not so closely laid but that the air may be freely forced through, over, or in contact with the moistened surfaces.

The evaporating fluid or refrigerant which I propose to use is water made cool by ice or otherwise; but other fluids, as ether, naphtha, and many other volatile fluids possessing similar characteristics, may be used, and it is in contemplation partially of such fluids, whose vapors are unpleasant, that I propose to blow the air through and out of the chamber or apartment, though I rely on the through-current for producing rapid evaporation.

The cooling of the air of a chamber or apartment may be applied to other purposes instead of comfort only to the occupant—as, for instance, freight-cars carrying perishable products may be kept cool for days, and preserve such articles.

The operation of this apparatus is as follows: The reservoir D having been supplied with any evaporating fluid or other refrigerant, it is allowed to pass in regulated quantities through the pipe *f*, which should be fitted with a valve, into chamber C, on to the head *d*, whence it is distributed, and from which it filters through the cloth *e*, if used; if not, passes through the opening between the pipes and head, (shown as occupied by the cloth in the drawing,) and trickles down, moistening the cloth or running over the surface of the pipes. The fan or other air-forcing contrivance being set in motion, if necessary, forces a current of air through the cooling-chamber, in contact with the wet or moistened surfaces, which takes up the moisture, and thus renders the metal cool. The cooled metal in turn cools the air in the air-passages, and it descends, followed by the warmer strata above it, through the air-passages, and out at the ends thereof, and into the lower part of the room or apartment, creating a current through the air-passages.

As the cooled air becomes heated again in the apartment, it rises to the top thereof, and again is circulated down through the air-passages, where it is again cooled by contact with the cooled surfaces of the air-passages, and thus a continued circulation of air is kept up and cooled in the apartment so long as the reservoir is supplied with the fluid, and the current of air is forced through the cooling-chamber—that is, if the refrigerant used requires the current of air to obtain the necessary temperature in the cooling-box.

The external walls of the room or apartment may be made double, to contain dead air-space, or may be filled with non-conducting material, so as to retain the cooled air within it.

It will be understood that the air, in passing through the passage C, will be dried as well as cooled by its moisture condensing on the surface of the metal forming the passage.

I have said that the through-current carries off the vapors that would otherwise be unpleasant in the use of such volatile liquids or fluids mentioned. I do not mean that this is the sole purpose of the through-current, for I depend on the through-current for rapid evaporation of the cooling-liquid and an immediate removal of the vapor to produce the desired effect, though it is obvious that in some cases the current of air may be very light, and in some cases it may be stopped, according to the kind of refrigerant used, and if the cooling be sufficient without it, as in the use of some well-known refrigerants, the amount of air would be injurious rather than beneficial.

The points of the invention are, first, a series of pipes or cooling-surfaces, arranged inside of the apartment to be cooled, in combination with a separate reservoir from which the refrigerant is supplied, and circulates over or against the cooling-surfaces; second, a current of air, in combination with a series of pipes or cooling-surfaces inside of the apartment to be cooled, by which the cooling power of the refrigerant may be augmented and the unpleasant odor carried off; third, a chamber or distributing device, in combination with the cooling pipes or surfaces, by which the refrigerant is distributed to and made to pass over the cooling-surfaces.

Therefore I claim—

1. In combination with a cooling-chamber insulated from the external air, a closed chamber or box fitted with a series of tubes or plates, to the surface of which the refrigerant is supplied, combined with a blower to cool the pipes by evaporating the refrigerant with a forced current of air.

2. A refrigerating apparatus consisting of a closed chamber or apartment insulated from the external air, and fitted with a series of cooling pipes or plates, combined with an external reservoir to contain the refrigerant, and from which it is made to flow or circulate over the surface of the cooling-pipes to cool the atmosphere within the apartment.

3. A refrigerating apparatus consisting of a closed chamber insulated from the external air, and fitted with a series of cooling pipes or plates, combined with an external reservoir to supply the refrigerant, a separate chamber, combined with the cooling pipes or plates, and connected to the external reservoir, for the purpose of distributing the refrigerant evenly upon the surface of the pipes or plates, substantially as shown by C.

4. In combination with a closed preserving-chamber, insulated from the external air, and combined with a refrigerating-chamber, a blower arranged to force a current of air through or over the refrigerant, by which the temperature of the air in the preserving-chamber is reduced and its circulation and distribution augmented.

JOHN L. ALBERGER.

Witnesses:

EDWARD WILHELM,
GEORGE H. SYKES.